United States Patent
Pecoroni et al.

(10) Patent No.: US 8,557,316 B2
(45) Date of Patent: Oct. 15, 2013

(54) METHOD FOR REDUCING THE PULP CONTENT OF FRUIT JUICES CONTAINING PULP

(75) Inventors: Stefan Pecoroni, Oelde (DE); Wolfgang Gunnewig, Beckum (DE); Rudiger Flocke, Rheda-Wiedenbruck (DE)

(73) Assignee: Gea Mechanical Equipment GmbH, Oelde (DE)

( * ) Notice: Subject to any disclaimer, the term of this patent is extended or adjusted under 35 U.S.C. 154(b) by 85 days.

(21) Appl. No.: 13/122,503

(22) PCT Filed: Oct. 7, 2009

(86) PCT No.: PCT/EP2009/063028
§ 371 (c)(1),
(2), (4) Date: Apr. 4, 2011

(87) PCT Pub. No.: WO2010/043524
PCT Pub. Date: Apr. 22, 2010

(65) Prior Publication Data
US 2011/0189359 A1 Aug. 4, 2011

(30) Foreign Application Priority Data
Oct. 13, 2008 (DE) .................. 10 2008 051 499

(51) Int. Cl.
*A23L 2/06* (2006.01)
(52) U.S. Cl.
USPC ............................. 426/231; 426/599; 426/495
(58) Field of Classification Search
USPC .................... 426/599, 231, 489, 490, 495
See application file for complete search history.

(56) References Cited

U.S. PATENT DOCUMENTS

| 3,523,889 A * | 8/1970 | Eis .................................. 210/713 |
| 4,689,157 A * | 8/1987 | Tenthoff ......................... 210/787 |
| 4,810,374 A * | 3/1989 | Bruning et al. ................ 210/104 |
| 4,828,865 A * | 5/1989 | Kohlstette et al. ............. 426/599 |
| 4,929,227 A * | 5/1990 | Zettier ............................. 494/41 |
| 4,942,051 A * | 7/1990 | Sardisco ........................ 426/489 |
| 5,137,738 A * | 8/1992 | Wynn .............................. 426/231 |
| 5,199,938 A * | 4/1993 | Kohlstette et al. .............. 494/10 |
| 5,260,079 A * | 11/1993 | Zettier et al. .................... 426/231 |
| 5,484,614 A * | 1/1996 | Clem .............................. 426/231 |
| 5,983,709 A * | 11/1999 | O'Keeffe ....................... 73/53.02 |
| 7,758,488 B2 * | 7/2010 | Zettier et al. ..................... 494/37 |
| 7,837,608 B2 * | 11/2010 | Klapper et al. .................. 494/37 |
| 2012/0021102 A1 * | 1/2012 | Milla et al. ...................... 426/232 |

FOREIGN PATENT DOCUMENTS

| DE | 35 36 624 | 4/1987 |
| DE | 36 20 548 | 12/1987 |
| EP | 0 241 128 | 10/1987 |
| WO | 95/01841 | 1/1995 |

OTHER PUBLICATIONS

Germany Search Report priority document No. 10 2008 051 499.3, filed Oct. 13, 2008.

* cited by examiner

*Primary Examiner* — Drew E Becker
(74) *Attorney, Agent, or Firm* — Barnes & Thornburg LLP

(57) ABSTRACT

A method for influencing the pulp content of a fruit or citrus juice. The method steps include: continuously purifying the juice of a pulp phase in a centrifugal field of a separator, the pulp being discharged from a drum of the separator through a pulp discharge line; measuring a density of the discharged pulp phase by a density flow-through measuring device; and, controlling a controllable device in accordance with a density measurement by the density flow-through measuring device thereby influencing the density of the pulp phase.

17 Claims, 2 Drawing Sheets

METHOD FOR REDUCING THE PULP CONTENT OF FRUIT JUICES CONTAINING PULP

This application is a national stage of International Application PCT/EP2009/063028, filed Oct. 7, 2009, and claims benefit of and priority to German Patent Application No. 10 2008 051 499.3, filed Oct. 13, 2008, the content of which Applications are incorporated by reference herein.

BACKGROUND AND SUMMARY

The present disclosure relates to a method for reducing the pulp content of fruit juices containing pulp, especially citrus juices. The fruit juice is continuously purified of the pulp phase in the centrifugal field of a separator and the pulp phase is discharged through a fluid discharge.

It is known to use separators in the production of citrus juices made of citrus fruits for clarifying a citrus juice containing pulp.

In the production of citrus juices, the citrus fruits are washed, sorted and supplied to juice-extraction machines, the so-called extractors. The juice running off the extractors has a high pulp content which is removed in further process steps. Finishers will remove the coarser fruit cells at first.

A hydrocyclone is optionally connected upstream of the separator in order to separate sand particles from the fruit juice. Separators will separate fine pulp in the next step separators. More or less pulp is removed depending on each production step.

In order to reduce the number of discharges of solid matter, which discharges are each accompanied by a certain loss of juice, it is known to guide the pulp phase from the solid chamber of the separator via a separating plate continuously to a peeling disk and to convey the same from there out of the machine. As a result of this operating mode of the separator, the number of discharges can be reduced considerably with the still present discontinuous solids discharge system. Solid particles will frequently accumulate over time on the plates during the clarification of juice. This layer of solids will reduce the efficiency of the clarification. It generally needs to be removed two to three times per hour by the discharge of the drum, for example, by opening the piston slide.

The free-flowing pulp phase, which is discharged via a separator plate, mostly comprises relatively soft, compressible solid matter. This concerns a separation of solids and fluids despite the given residual flowability of the pulp phase during the separation of this relatively viscous phase from the citrus juice.

After the clarification in the separator, further processing of the thus clarified citrus juice can occur, for example, concentration in evaporators in which the water content in the juice is reduced.

It is also known to control the separator in the clarification of the citrus juice by an optical turbidity device in the discharge of the clear-phase line in order to determine, for example, when an additional discharge of solid matter is necessary by the piston slide. A control of this kind, for securing a fully automatic operation, is not sufficient as a result of the consistency of the citrus fruit content and the rapidly changing properties of the product which is supplied to the machine.

The problem arises, especially after the start-up of the separator and after the discharge of solid matter, that clear juice will also flow through the peeling disk for the discharge of the pulp phase for a certain period of time, while pulp needs to accumulate again in the solids collecting chamber until it is discharged via the separator plate again.

It is known for solving this problem to seal the peeling disk for the discharge of the pulp phase by closing a valve downstream of this peeling disk and by opening the valve only when sufficient pulp has accumulated in the solids collecting chamber.

It is disadvantageous, in this procedure, that it requires a manual intervention during the start-up of the separator and after discharges of the solid matter with the help of the piston slide. It is not possible to perform any automatic control by way of the optical turbidity device because the measurement in the clear phase is not meaningful enough in this respect.

In view of the background as explained above, to the present disclosures provides for a method to further optimize the method that is disclosed above. In particular, regarding the necessary manual interventions during the start-up of the separator and after discharges of the solid matter, the method according to the present disclosure avoids such manual interventions.

The present disclosure thus relates to a method for influencing the pulp content of a fruit or citrus juice. The method steps include: continuously purifying the juice of a pulp phase in a centrifugal field of a separator, the pulp being discharged from a drum of the separator through a pulp discharge line; measuring a density of the discharged pulp phase by a density flow-through measuring device; and, controlling a controllable device in accordance with a density measurement by the density flow-through measuring device thereby influencing the density of the pulp phase.

Additional features of the present disclosure are discussed below.

Accordingly, a density flow-through measuring system is installed in the pulp discharge line from the separator drum, which measuring system controls a controllable element depending on the density measured.

The method, according to the present disclosure, is especially suitable for fruit juices which are of such a nature that it is possible to discharge the solids-like, but still sufficiently flowable, pulp phase by fluid discharge from the separator drum. The method according to the present disclosure is thus especially suitable for citrus fruits. In addition, the method according to the present disclosure can also be used for the reduction of the pulp content of other fruits which have such a consistency that its pulp can be guided through a fluid discharge especially by a peeling disk out of the separator drum.

According to an embodiment of the present disclosure, the pulp phase is recirculated entirely or partly via a recirculation line to the feed line of the separator in the case of an inadequate content of solid matter, for example, when the density limit is not reached. The problem of product losses after the start-up of the machine and after discharges of solid matter with a further discontinuously working solids discharge system is thus solved in a simple way. That is because after the start-up and after the discharging, the phase flowing off via the separator plate, which is mostly clear juice at first, is guided back to the feed line after a density measurement until a sufficient amount of pulp has accumulated in the solids collection chamber after a certain period of time, so that the pulp starts to flow over the separator plate. The density measurement is repeated after a predetermined period of time in order to determine whether the density of the pulp is high enough in the meantime in order to stop the recirculation of the pulp to the feed line of the separator. This is followed by a changeover and the pulp guided out of the separator is guided to a pulp tank.

The start-up of the separator and the further operation after the discharge of solid matter can thus be automated in a simple manner by a simple control method, according to the present disclosure.

The following parameter ranges may be applied in orange juice in a separator of type GSE 200 supplied, for example, by GEA Westfalia Separator GMBH, which separator, is equipped with a continuous "depulping apparatus" having the following characteristics:

Feed capacity of juice: 15,000 to 25,000 L/h; or, for example, 18,000 to 22,000 L/h;

Content of solid matter in the incoming juice: 10 to 14% by volume; or, for example, 10 to 12% by volume;

Content of solid matter in the discharged juice: 0.5 to 2.0% by volume; or, for example, 0.5 to 1% by volume;

Target concentration of solid matter in the pulp flow: 80 to 95% by volume;

Actual concentration of solid matter in the pulp flow during start-up: 10 to 28% by volume, whereby juice concentration in the feed may be doubled; and Switching point of control unit: 60 to 80% by volume; or, for example, 75 to 80% by volume.

The following parameters are advantageous and may be obtained in the processing of lemon juice:

Feed capacity of juice: 12,000 to 25,000 L/h; or, for example, 15,000 to 18,000 L/h;

Content of solid matter in the incoming juice: 8 to 12% by volume; or, for example, 8 to 10% by volume;

Content of solid matter in the discharged juice: 0.5 to 2.0% by volume; or, for example, 0.5 to 1% by volume;

Target concentration of solid matter in the pulp flow: 80 to 95% by volume;

Actual concentration of solid matter in the pulp flow during start-up: 16 to 24% by volume, whereby juice concentration in the feed may be doubled; and Switching point of control unit: 60 to 80% by volume; or, for example, 75 to 80% by volume.

Other aspects of the present disclosure will become apparent from the following descriptions when considered in conjunction with the accompanying drawings.

DETAILED DESCRIPTION

Figure 1:
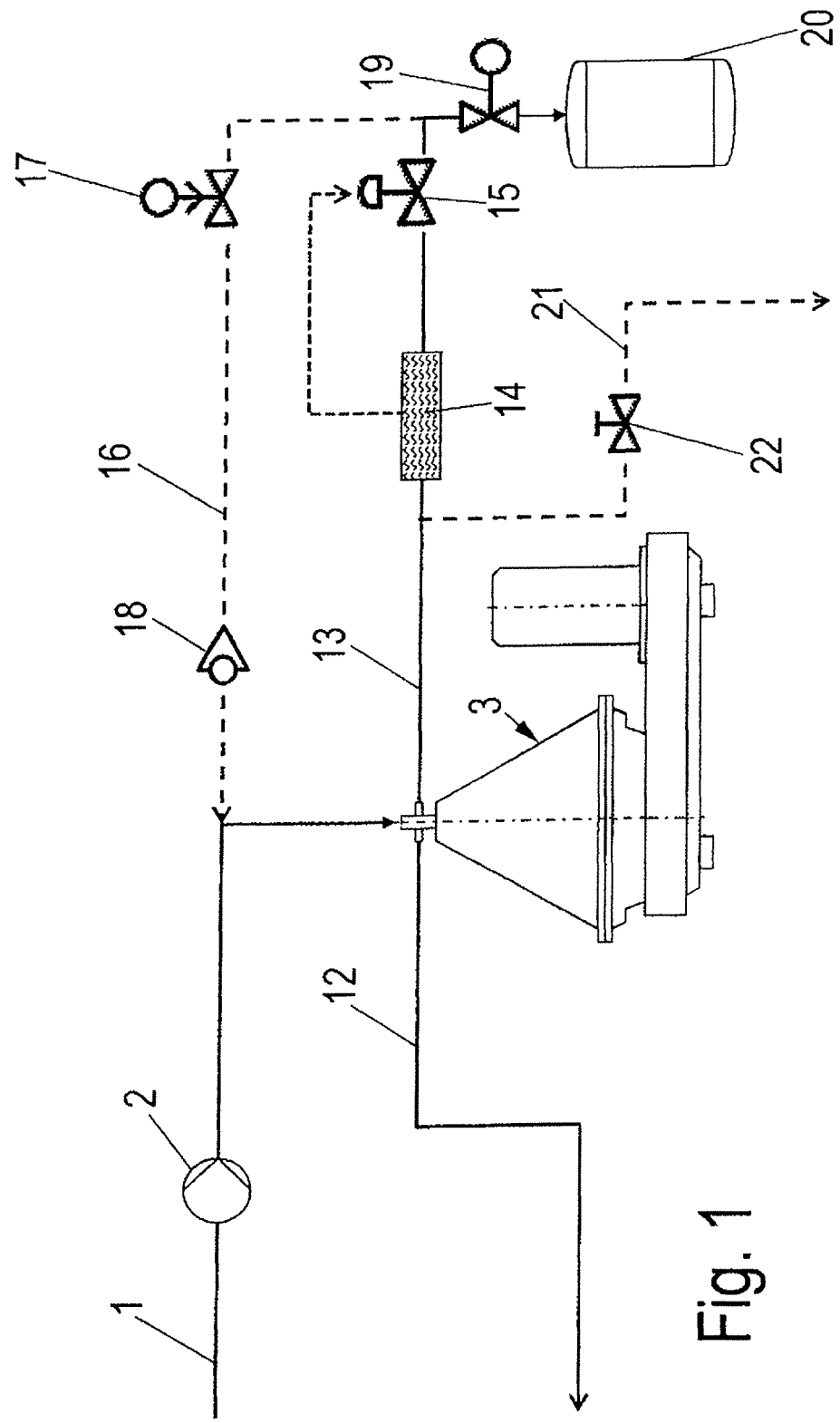
FIG. 1 shows a schematic illustration of an installation of devices for a method for reducing the pulp content of lemon juices, according to the present disclosure.
Figure 2:
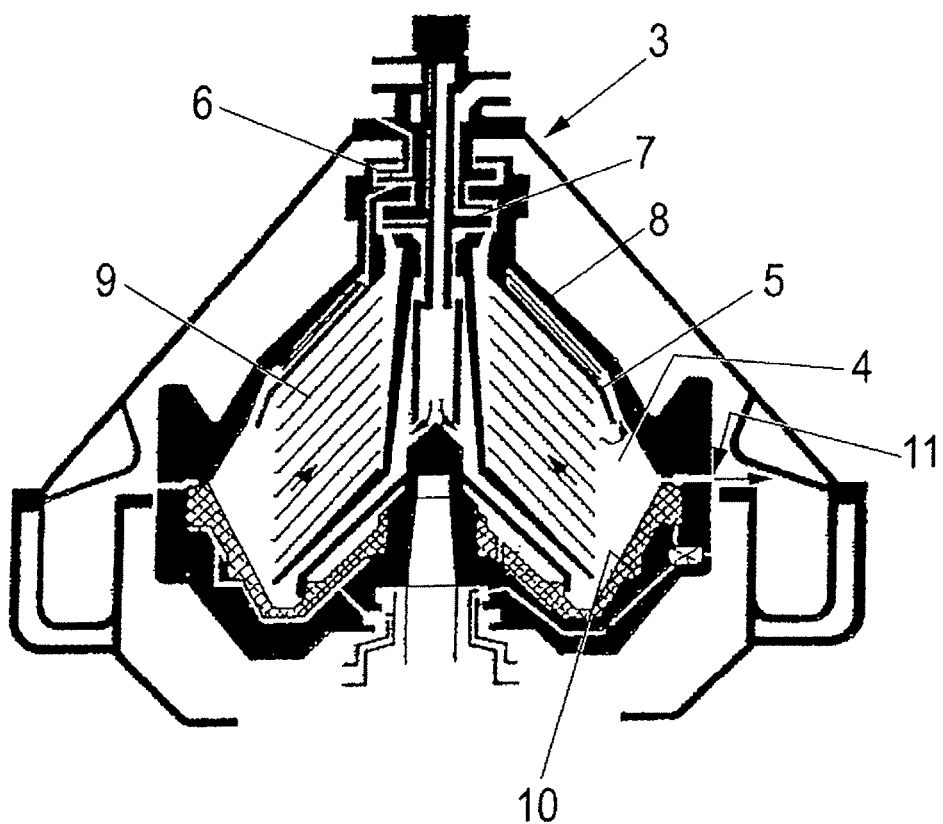
FIG. 2 shows a sectional view of known separator suitable for performing the method of FIG. 1.

In accordance with FIG. 1, a citrus juice with a pulp content to be reduced is guided through a feed line 1 in which a pump 2 is disposed into a drum 8 (see FIG. 2) of a disk separator 3 which separator 3 is shown schematically in FIG. 1. The disk separator 3 clarifies the fruit juice, for example, the citrus juice, with the pulp phase containing the pulp being continuously discharged through a first discharge device and the clarified citrus juice through a second discharge device.

The pulp phase accumulates in a solid-matter collecting chamber 4 (see FIG. 2) of the separator 3 and is discharged in operation as a viscous phase, which has a high solids content but is still flowable, via a separator plate 5 and a peeling disk 6 as a first discharge device. The first discharge device is a discharge device which is determined for the discharge of fluids, and the clarified citrus juice as a free-flowing lighter phase is discharged via a further peeling disk 7 as a second discharge device.

A separator plate packet 9 may be arranged in the drum 8 of the separator 3 which is arranged for continuous operation. Drum 8 further comprises a discontinuously working discharge system for solid matter, which discharge system comprises a fluid-controlled piston slide 10 and discharge openings 11 for the solid matter.

A discharge line 12 for the clarified juice is arranged downstream of the peeling disk 7, through which the clarified citrus juice is supplied to further processing or an intermediate tank. The discharge system for the solid matter, which may be supplemented by another discharge, is used to discharge solid matter if the content of turbidity-causing substances in the clarified citrus juice becomes too high to rinse a separate plate packet 9 in the drum 8.

A pulp discharge line 13 is connected downstream of the peeling disk 6 (see FIG. 1), by which pulp discharge line 13 the pulp phase is discharged.

A density flow-through measuring device 14 is switched or built into the pulp discharge line 13, with which measuring device 14 the density of the pulp phase flowing through the measuring device may be measured and determined. Depending on the density measurement, the density flow-through measuring device 14 or a control device associated with the measuring device 14, controls a control valve 15 which is provided downstream of the density flow-through measuring device 14, and with which the peeling disk 6 can be throttled.

In order to avoid losses, a part of the pulp phase or the entire pulp phase is guided back into the drum 8 by changeover to a recirculation line 16 branching off from the pulp discharge line 13 between the output of the control valve 15 and the feed line 1. That is done in case the content of solid matter in the pulp phase is too low. That may mean, especially during start-up or after a discharge of solid matter from the solid-matter discharge system, using the piston slide until sufficient pulp has been accumulated in the collecting chamber 4 for the solid matter after a certain period of time, so that it begins to flow over the separator plate 5. The density measurement can be repeated in intervals. Once the density is sufficiently high, then this indicates that changeover can occur.

A valve, for example, a 2/2-port directional control valve 17 and an optional non-return valve 18, may be disposed in the recirculation line 16 in order to enable a closing off of the recirculation line 16 to prevent inflow or outflow in the region of the non-return valve 18.

When the recirculation line 16 is closed, the pulp phase is guided here via a further 2/2-port directional control valve 19 to a pulp tank 20.

It is within the scope of the present disclosure to branch off a further branch line 21 from the pulp discharge line 13, which occurs, for example, before the measuring device 14, and in which a further valve 22 can be disposed. This branch line 21 can be used for taking samples.

Although the present disclosure has been described and illustrated in detail, it is to be clearly understood that this is done by way of illustration and example only and is not to be taken by way of limitation. The scope of the present disclosure is to be limited only by the terms of the appended claims.

We claim:

1. A method for influencing the pulp content of a fruit or citrus juice so that a sufficient amount of pulp is accumulated to flow over a separation plate of a separator, the method steps comprising:

providing a separator having a separator plate;
continuously separating a juice of a pulp phase in a centrifugal field of the separator, the juice including a pulp content having been fed into the separator and the pulp phase being discharged from a drum of the separator through a pulp discharge line;
measuring a density of the discharged pulp phase by a density flow-through measuring device;
controlling a controllable device in accordance with a density measurement by the density flow-through measuring device thereby influencing the density of the pulp phase and providing a sufficient amount of pulp to flow over the separator plate; and
controlling a first peeling disk of the separator, the first peeling disk configured to control the discharge of the pulp phase from the separator.

2. The method according to claim 1, wherein the controllable device is a control valve disposed in the pulp discharge line.

3. The method according to claim 2, wherein the pulp phase is discharged from the drum of the separator as a flowable heavier phase via The separation plate and the first peeling disk and a clarified fruit juice is discharged as a flowable lighter phase via a second peeling disk.

4. The method according to claim 3, wherein the first peeling disk is throttled by the control valve.

5. The method according to claim 1, wherein when the density measurement falls below a predetermined lower limit value, at least a part of the pulp phase flowing through the pulp discharge line is recirculated through a recirculation line branching off from the pulp discharge line to a feed line into the drum.

6. The method according to claim 5, wherein the recirculation of the pulp phase to the feed line occurs during a start-up of the separator.

7. The method according to claim 5, wherein a content of the pulp phase which is not guided through the recirculation line is guided to a pulp tank.

8. The method according to claim 5, wherein the recirculation of the pulp phase to the feed line occurs after discharges of solid matter.

9. A method for providing a sufficient amount of pulp accumulation in a centrifuge solid matter collection chamber such that the pulp begins to flow over a separation plate in the centrifuge, the method steps, comprising:
providing a centrifuge having a drum, a separator plate, a solids collection chamber, and a first peeling disk;
feeding a juice having a pulp content into the centrifuge via a feed line;
initially starting up the centrifuge and separating the juice having the pulp content into at least a pulp phase, the pulp phase being discharged from the separator via the first peeling disk and a pulp discharge line, and the pulp phase being initially substantially clarified juice;
measuring a density of the discharged pulp phase by a density flow-through measuring device;
controlling a controllable device based upon the density measurement of the pulp phase and recirculating at least a portion of the discharged pulp phase via a recirculating line back to the feed line until a sufficient amount of pulp has accumulated in the solids collection chamber such that the pulp starts to flow over the separator plate.

10. The method according to claim 9, wherein the controllable device is a control valve disposed in the pulp discharge line.

11. The method according to claim 10, wherein the pulp phase is discharged from the drum of the separator as a flowable heavier phase via the separator plate and the first peeling disk, and a clarified fruit juice is discharged as a flowable lighter phase via a second peeling disk.

12. The method according to claim 11, wherein the first peeling disk is throttled by the control valve.

13. The method according to claim 9, wherein when the density measurement falls below a predetermined lower limit value, at least a part of the pulp phase flowing through the pulp discharge line is recirculated through the recirculation line branching off from the pulp discharge line to the feed line into the drum.

14. The method according to claim 13, wherein the recirculation of the pulp phase to the feed line occurs during the starting-up of the separator.

15. The method according to claim 13, wherein a content of the pulp phase which is not guided through the recirculation line is guided to a pulp tank.

16. The method according to claim 13, wherein the recirculation of the pulp phase to the feed line occurs after discharges of solid matter.

17. The method of claim 9, further comprising the step of repeating the density measurement to determine when the density of the pulp is high enough to stop the recirculating of the pulp phase to the feed line, thereby reducing the number of discharges of solid matter from the centrifuge.

* * * * *